US010313139B2

(12) United States Patent
Dwelley et al.

(10) Patent No.: US 10,313,139 B2
(45) Date of Patent: Jun. 4, 2019

(54) POWER OVER DATA LINES SYSTEM WITH REDUNDANT POWER CONNECTIONS (71) Applicant: Linear Technology Corporation, Milpitas, CA (US)

(72) Inventors: David M. Dwelley, Santa Barbara, CA (US); Andrew J. Gardner, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/479,187

(22) Filed: Apr. 4, 2017

(65) Prior Publication Data
US 2017/0310491 A1    Oct. 26, 2017

Related U.S. Application Data (60) Provisional application No. 62/325,364, filed on Apr. 20, 2016.

(51) Int. Cl.
*H04L 12/437*    (2006.01)
*H04L 12/10*    (2006.01)
(Continued)

(52) U.S. Cl.
CPC .............. *H04L 12/10* (2013.01); *G06F 1/266* (2013.01); *H04B 3/44* (2013.01); *H04L 12/403* (2013.01);
(Continued)

(58) Field of Classification Search
CPC ....... H04Q 2011/0081; H04Q 11/0071; H04Q 11/0478; H04Q 2011/0043;
(Continued)

(56) References Cited

U.S. PATENT DOCUMENTS 6,552,443 B1    4/2003 Johnke et al.
7,984,201 B2 *  7/2011 Nomura .............. G06F 13/4081
                                                        710/10
(Continued)

FOREIGN PATENT DOCUMENTS

DE          19813964 A1    8/1999
DE      102006036770 A1    2/2008
(Continued)

OTHER PUBLICATIONS

Extended EP Search Report, dated Jul. 25, 2017, 10 pages.

*Primary Examiner* — Vineeta S Panwalkar
(74) *Attorney, Agent, or Firm* — Patent Law Group LLP; Brian D. Ogonowsky (57) ABSTRACT In one embodiment, a master device has a first port and a second port and initially applies a DC voltage only to the first port. A plurality of slave devices, each have a third port and a fourth port, are serially connected to the master device in a ring, via conductors, starting at the first port and ending at the second port. The conductors simultaneously carry the DC voltage and differential data. Each slave device, after performing a detection routine, then sequentially applies the DC voltage to the adjacent downstream slave device in a first direction around the ring. If the master does not detect the presence of the DC voltage at its second port, the master device applies the DC voltage to both the first port and the second port to sequentially power up the slave devices in both directions around the ring of slave devices.

20 Claims, 5 Drawing Sheets (51) Int. Cl.
*H04L 12/24* (2006.01)
*G06F 1/26* (2006.01)
*H04B 3/44* (2006.01)
*H04L 12/40* (2006.01)
*H04L 12/403* (2006.01)
*H04L 12/44* (2006.01)

(52) U.S. Cl.
CPC ...... *H04L 12/40045* (2013.01); *H04L 12/437* (2013.01); *H04L 12/44* (2013.01); *H04L 41/0654* (2013.01)

(58) Field of Classification Search
CPC .......... H04Q 2011/0052; H04L 49/351; H04L 49/357; H04L 12/437; H04L 12/10; H04L 12/403; H04L 12/44; H04L 12/40045; H04B 3/44; G06F 1/266
See application file for complete search history.

(56) References Cited

U.S. PATENT DOCUMENTS

| | | | |
|---|---|---|---|
| 2007/0284941 A1* | 12/2007 | Robbins | H04L 12/10 307/2 |
| 2013/0086284 A1* | 4/2013 | Shaver | G06F 1/266 710/18 |
| 2014/0025999 A1* | 1/2014 | Kessler | G06F 13/4295 714/43 |
| 2014/0321261 A1* | 10/2014 | Lee | H04L 12/437 370/216 |
| 2015/0145324 A1 | 5/2015 | Heath et al. | |
| 2016/0054777 A1 | 2/2016 | Dwelley et al. | |

FOREIGN PATENT DOCUMENTS

| | | |
|---|---|---|
| EP | 0551114 A1 | 7/1993 |
| EP | 2228943 A1 | 9/2010 |

* cited by examiner

POWER OVER DATA LINES SYSTEM WITH REDUNDANT POWER CONNECTIONS

CROSS-REFERENCE TO RELATED APPLICATIONS

This application claims priority to U.S. provisional application Ser. No. 62/325,364, filed Apr. 20, 2016, by David M. Dwelley et al., incorporated herein by reference.

FIELD OF THE INVENTION

This invention relates to systems, such as Power Over Ethernet (PoE) and Power over Data Lines (PoDL), where DC power is transmitted over differential data lines and a routine is carried out before the full voltage is applied to the data lines. The invention more particularly relates to a system of interconnected Power Supply Equipment (PSE) and Powered Devices (PDs) which uses redundant power and data paths to improve the reliability of the system.

BACKGROUND

It is known to transmit power over data lines to power remote equipment. Power over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the Ethernet switch is transmitted over two sets of twisted pair wires in the standard CAT-5 cabling. The same two sets of twisted pair wires may also conduct differential data signals, since the DC common mode voltage does not affect the data. In this way, the need for providing any external power source for the Powered Devices (PDs) can be eliminated. The standards for PoE are set out in IEEE 802.3, incorporated herein by reference. The CAT-5 cable has four twisted wire pairs, and two of the wire pairs are typically not used.

A more recent development is called Power over Data Lines (PoDL), where only one twisted wire pair carries both differential Ethernet data and DC power. Such a system also uses PSEs and PDs. PoDL is particularly attractive for automobiles due to the minimum wiring needed. Any electronic device may be powered by the PoDL system. The DC voltage transmitted by the twisted wire pair in an automobile will usually be 12 volts. The IEEE has developed the 802.3bu standard for PoDL.

In both PoE and PoDL, there is a low power detection phase that is conducted before the full DC voltage is applied to the wires. The detection phase looks for a signature from the PD that indicates that the PD is compatible for PoE or PoDL. There may also be a low power classification phase following the detection phase, where the power requirements of the PD are conveyed. The PSE then supplies the full DC voltage, by closing a switch coupled between the power source and the wires, after it determines that it can supply the required power. Controller ICs for PoE are commercially available that carry out the various routines, close a switch to apply the full DC voltage to the wires, and detect faults.

Although PoE and PoDL are advantageous for use in an automobile (and other applications) due to the reduced wiring leading from the PSE to each PD, it would be desirable to further reduce the required wiring while improving reliability.

SUMMARY

In one embodiment, a powered data communications system is assumed to be a PoDL system. All DC voltages are coupled to the wires via DC coupling inductors, and all the PHYs (Physical Layer devices for processing the differential Ethernet data) are AC coupled to the wires via series capacitors. The DC voltage is selectively coupled to the wires via a switch, such as a MOSFET.

A master PSE receives a DC voltage from a power source, such as the battery of an automobile. The master PSE has a first port for connection to a first twisted wire pair and has a second port for connection to a second twisted wire pair. A series ring of slave PDs includes an end slave PD coupled to the first port of the master PSE and has the other end slave PD coupled to the second port of the master PSE. Each slave PD has an identical pair of ports, where each port can send or receive data and DC power. One port is coupled to an upstream slave PD and the other port is coupled to a downstream slave PD.

In one embodiment, assuming the system is operating without any faults and the DC power is to flow in a clockwise direction around the ring of slave PDs, the master PSE performs a low power detection routine for the "right" end slave PD connected to the first port of the master PSE. If the signature is detected, the master PSE closes a "right" switch to connect the full DC voltage to the "right" end slave PD. The slave PD then powers up and then also runs a detection routine for its adjacent slave PD. If the signature is detected, the "right" end slave PD closes its switch to couple the full DC voltage to the adjacent slave PD. This sequential detection and powering up process is performed for all the slave PDs in the ring until they are all powered up. Effectively, each slave PD operates as both a PD and a PSE since it is performing a detection routine and only closing its switch after the downstream slave PD has conveyed the correct signature. The signature may be a 25 k Ohm resistance across the wires. The entire detection and startup process for all the slave PDs may be on the order of one second to a few seconds, depending on the number of slave PDs involved.

The "left" end slave PD is adjacent to the master PSE and connected to its second port. The "left" end slave PD is the last to power up, and it performs a detection routine on the master PSE at its second port, followed by coupling the DC voltage to the wires leading to the second port of the master PSE. In this way, the master PSE also acts as a PD since it also provides a signature (e.g., 25 k Ohms) to the adjacent slave PD to allow the slave PD to know to couple the DC voltage to the second port of the master PSE.

The master PSE then detects the existence of the DC voltage at its second port and knows that there are no faults along the ring. The system is then operated in a normal manner.

If there is an open circuit or short circuit along the ring, the master PSE will not receive the DC voltage at its second port within a prescribed time and will then supply power to both its first port and second port so the DC voltage is sequentially applied to the slave PDs in both a clockwise direction and a counter-clockwise direction. Since each of the slave PDs and the master PSE have two sets of identical ports, DC power and data can flow in either direction along the ring.

If a short or open circuit exists between two slave PDs in the ring, the detection routine will fail, and the slave PD performing the detection routine will keep its switch open so that no DC voltage is coupled to the failed wiring. Similarly, the slave PD on the other side of the faulty wires will be powered up by the DC voltage coming from the other direction and will also perform a detection routine for the adjacent downstream slave PD.

This detection routine will also fail and the slave PD will keep its switch open so as not to supply the DC voltage to the faulty wires. In this way, the fault is isolated between slave PDs by their open switches, and DC power is provided to all the slave PDs in both a clockwise and counter-clockwise manner.

In a related embodiment, the PDs are not connected in a ring but are connected in series between a first master PSE and a second master PSE. The process is similar to the process described above, where a first master PSE supplies the DC voltage to all the slave PDs in one direction. Each slave PD performs a detection routine before coupling the DC voltage to the downstream slave PD. If the second master PSE detects that the DC voltage has been sequentially applied to all the slave PDs, the system is operating normally. If the second master PSE does not detect that the DC voltage has been applied to all the slave PDs within a prescribe time, it will then supply the DC voltage to its adjacent slave PD after performing the detection routine. In this way, the wire fault is isolated between two slave PDs, yet all the slave PDs are still powered by the DC voltage coming from either of two directions.

The invention may be applied to PoE systems, PoDL systems, and other related systems.

BRIEF DESCRIPTION OF THE DRAWINGS

Elements that are the same or equivalent are labeled with the same numeral.

DETAILED DESCRIPTION

Figure 1:
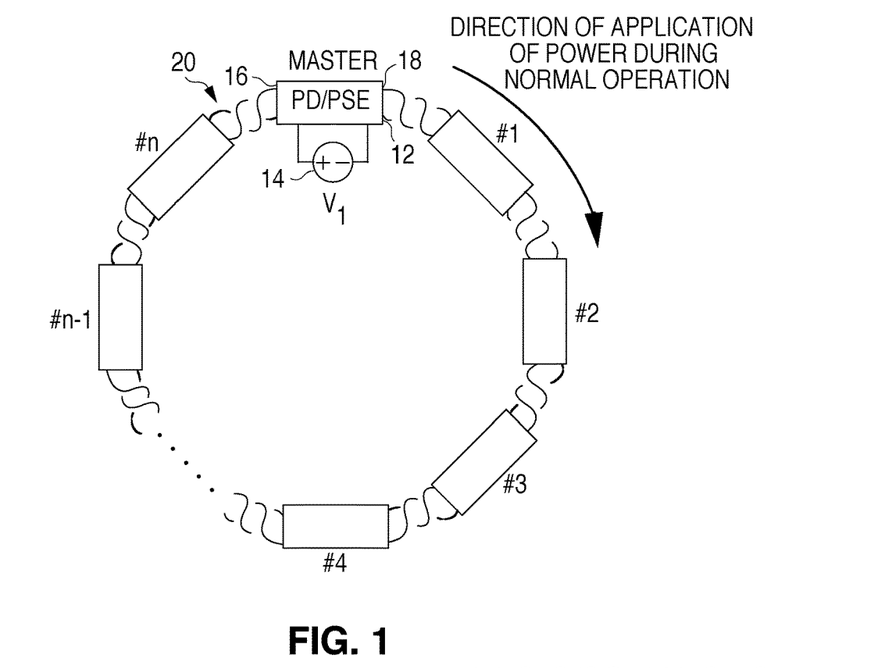
FIG. 1 illustrates a master PD/PSE connected to a ring of slave PD/PSEs, where no fault exists and the DC voltage is sequentially applied to all the slave PD/PSEs in a clockwise direction after each slave PD/PSE performs a detection routine and closes a switch to couple the DC voltage to the downstream slave PD/PSE.
Figure 2:
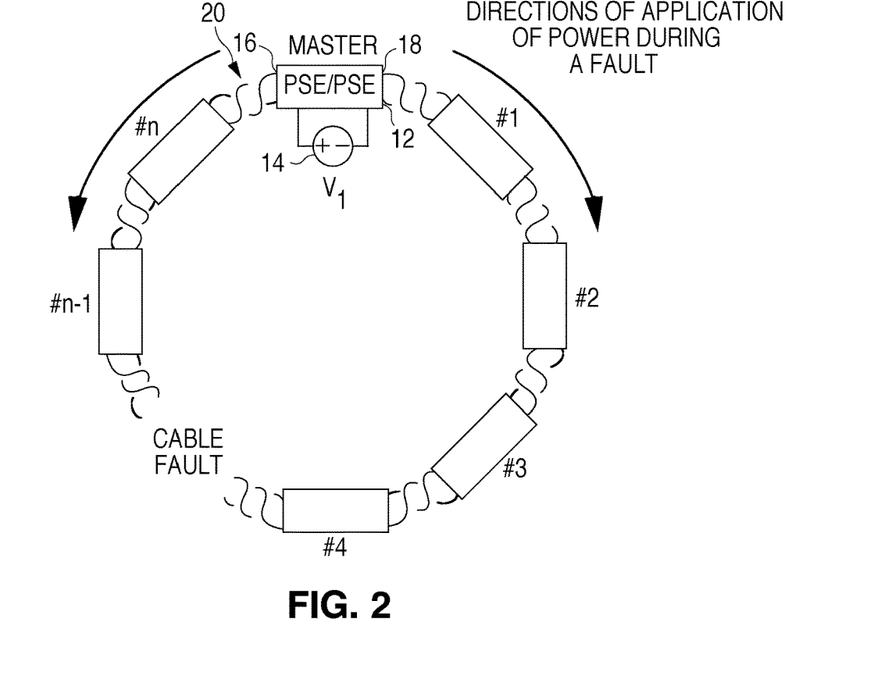
FIG. 2 illustrates the system of FIG. 1 where there is a wire fault, and the master PD/PSE supplies the DC voltage in both a clockwise direction and a counter-clockwise direction so that all the slave PD/PSEs are powered, and the faulty section is isolated by open switches.

FIGS. 1 and 2 illustrate a PoDL system in accordance with one embodiment of the invention. The method performed by the system of FIGS. 1 and 2 will be described with reference to the flowchart of FIGS. 3A and 3B. The use of the term "PD/PSE" or "PSE/PD" conveys that, when there is no wire fault and the DC voltage is applied sequentially in a clockwise manner around the ring, one side of each device (the PD side) receives power from an upstream device and the other side of each device (the PSE side) delivers DC power to the downstream devices.

Figure 6:
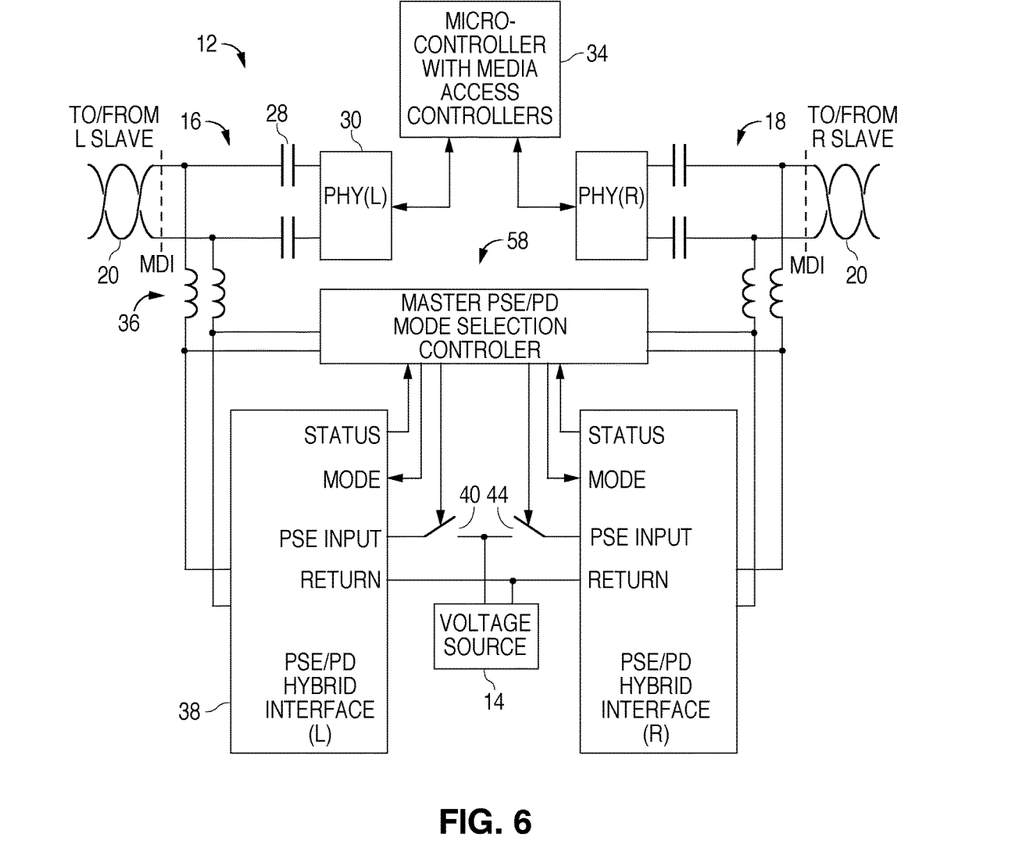
FIG. 6 illustrates an example of a master PD/PSE, which is similar to the slave PD/PSE except that it receives DC power from an external source (e.g., a battery), not via the twisted wire pair.

In FIG. 1, a master PD/PSE 12, shown in more detail in FIG. 6, receives a voltage from a voltage source 14. The voltage source 14 may be a battery. The master PD/PSE 12 has a first port 16 and a second port 18. Each port comprises a first terminal for a first wire in a twisted wire pair 20 and a second terminal for a second wire in the wire pair 20. The wire pair 20 carries full-duplex differential Ethernet data as well as the DC voltage from the voltage source 14. As will be later described in detail, the master PD/PSE 12 and the slave PD/PSEs use AC coupling/decoupling and DC coupling/decoupling components to couple and decouple the AC data and the DC voltage to and from the wire pair 20. The master PS/PSE 12 may additionally convert the DC voltage from the external voltage source 14 to a more suitable voltage, via a DC/DC converter in the master PD/PSE 12, for transmission on the wire pair 20.

Figure 4:
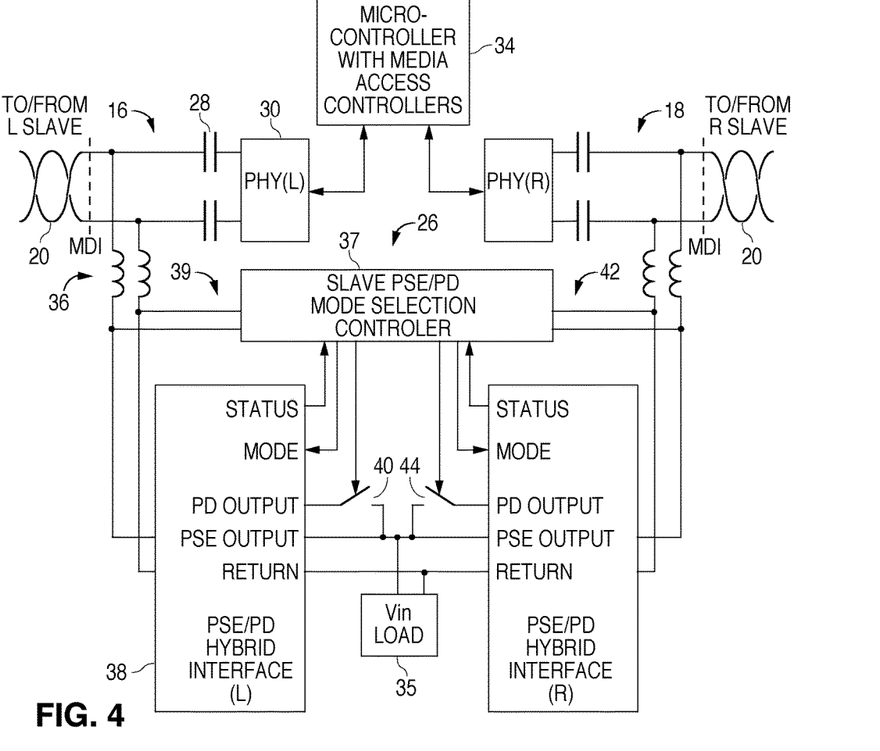
FIG. 4 illustrates an example of a single slave PD/PSE having two ports that are essentially mirror images of each other, where a slave PD/PSE controller IC performs the detection routine for either port and controls a MOSFET switch to couple a DC voltage to the wires coupled to either port.

The slave PD/PSEs are labeled #1 through #n and are similar to the master PD/PSE 12 except that they only receive their power via the wire pair 20. Details of the slave PD/PSEs are shown in FIG. 4. Each slave PD/PSE has two identical ports where, depending on the direction of the data and DC voltage, one port receives the AC and DC signals on the wire pair 20 from an adjacent slave PD/PSE (or master PD/PSE 12) and the other port forwards the AC and DC signals to its other adjacent slave PD/PSE (or master PD/PSE 12).

Each slave PD/PSE and the master PD/PSE 12 has two separately controllable hybrid PSE/PD interfaces coupled to the wires. When configured as a PSE interface, one of the hybrid interfaces may source a DC voltage to a left side adjacent slave PD/PSE via a left side switch, while the other hybrid interface may be configured as a PD in order to receive DC voltage from a right side adjacent slave PD/PSE via a right side switch. This allows the master PD/PSE 12 and slave PD/PSEs to determine whether the DC voltage travels around the ring of slave PD/PSEs in a clockwise direction or a counter-clockwise direction (in the event of a wire fault).

Prior to describing the method performed by the system of FIG. 1, additional detail of a slave PD/PSE and the master PD/PSE 12 will be described with reference to FIGS. 4-6.

FIG. 4 illustrates any one of the slave PD/PSEs #1 through #n. The left port 16 and the right port 18 are connected to a wire pair 20 (FIG. 1) segment, which connects to a port of an adjacent slave PD/PSE or the master PD/PSE 12. The left and right side circuitry are identical and the description will mainly describe the left side circuitry to avoid redundancy.

At the ports 16 and 18 may be a signature resistor (not shown) connected across the wire pair 20 that is nominally 25 k Ohms. This signature resistance is detected by the adjacent slave PD/PSE or master PD/PSE 12 when performing a handshaking routine to detect whether the adjacent device is PoDL-compatible. The handshaking routine includes a low power routine that detects whether or not there is a signature impedance within a specified range around 25 k Ohms. Such a detection routine is well known and may be similar to the detection routine for PoE, established by the IEEE. The handshaking routine may also perform a low power classification routine that detects the required power usage of the slave PD/PSE and other characteristics. Such a classification may be conveyed by a particular component (not shown) across the wires, such as a Zener diode or other component whose value conveys the operating characteristics. Other detection and classification techniques are envisioned and are not required for the present invention.

A slave PD/PSE controller 26 may be an IC that carries out the various routines using a programmed microprocessor or programmed firmware, such as a state machine.

If the adjacent slave PD/PSE or master PD/PSE transmits data and DC signals, the pair of matched AC coupling capacitors 28 passes only the differential Ethernet data to the PHY 30, and the data is processed by a data processing unit 34 in the slave PD/PSE containing a micro-controller along with Media Access Controllers. The data processing unit 34 may be conventional. The DC voltage on the wire pair is DC-coupled to an input of the slave PD/PSE controller 26 and to the remainder of the slave PD/PSE load 35 (including the data processing unit 34) via a pair of matched inductors 36. The PD/PSE controller 26 is shown including a slave PSE/PD mode selection controller 37 and left and right PSE/PD hybrid interfaces 38.

The low power handshaking routine and the detection of the DC voltage on the wire pair is carried out via conductors 39 that bypass the switch 40.

Assuming the slave PD/PSE is to receive DC power from its right side adjacent slave PD/PSE or master PD/PSE 12, the slave PD/PSE controller 26 senses (via conductors 42) that the DC voltage on the wire pair is above a threshold and closes its right side switch 44. The slave PD/PSE is now powered up and performs the handshaking routine for the left side adjacent slave PD/PSE. When the slave PD/PSE has determined that the left side slave PD/PSE is PoDL-compatible after a handshaking routine, the slave PD/PSE closes the left side switch 40 to forward the DC voltage to the wire pair 20 to power up the left side adjacent slave PD/PSE. Essentially, the closing of both switches 40 and 44 connects the left wire pair 20 to the right wire pair 20 via the inductors 36. The PSE input port of the PSE/PD hybrid interface 38 receives the DC voltage via either one of the switches 40/44 for powering all the slave circuitry from either side. The PD output port of the PSE/PD hybrid interface 38 couples the incoming DC voltage from one side to the wire pair 20 on the other side via the associated switch 40 or 44. PD and PSE controllers for PoE are well known, and adapting the PoE controller software and hardware to perform the PoDL routines could be easily done by those skilled in the art.

A conventional media dependent interface (MDI) couples the wire pair to the slave PD/PSE.

Since the left and right side circuitry are the same, the slave PD/PSE can receive the DC power from either side and forward it to the slave PD/PSE on either side depending on whether the sequential powering up is clockwise or counter-clockwise for that particular slave PD/PSE.

Figure 5:
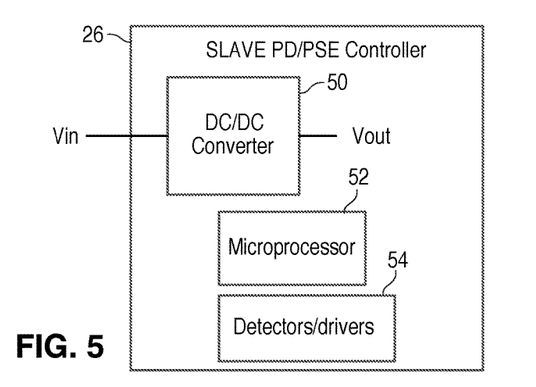
FIG. 5 illustrates certain function blocks in the slave PD/PSE controller IC in FIG. 4.

FIG. 5 illustrates various functional units in the slave PD/PSE controller 26. The nominal 12 volts (assuming an automobile application) supplied by the wire pair is converted into a suitable voltage for the slave PD/PSE load by a DC/DC converter 50. A programmed microprocessor 52 or a firmware device carries out the various routines and controls the various switches. A detector/driver 54 comprises the various components used to detect the incoming signals and control the switches. The detector/driver 54 may also detect the current and turn off the switches 40/44, using a control signal at the status port in the PSE/PD hybrid interface 38, if the current exceeds a threshold (indicating a fault). The switches 40 and 44 may be internal or external to the controller 26 IC.

The master PD/PSE 12 is shown in FIG. 6 and may be similiar to the slave PD/PSE, except for its software and that the master PD/PSE 12 is powered by an external DC voltage source 14 connected to the power input terminals of the master PD/PSE 12 rather than via the wire pair 20. Therefore, the same numerals used to identify the components of the slave PD/PSE are also used to identify the similar components in the master PD/PSE 12. The master PD/PSE 12 initiates the sequential process of powering all the slave PD/PSEs in the ring. The master PD/PSE controller 58 may be similar to the slave PD/PSE controller 26 of FIG. 5 except for the software.

In the example of FIG. 1, it is assumed there is no wire fault (e.g., no short or open wires in the wire pair 20 around the ring). The software (or firmware) in the master controller within the master PD/PSE 12 determines that the DC voltage should propagate around the ring in a clockwise direction and so closes the "right side" switch 44 (FIG. 6) to supply the DC voltage only on the wire pair 20 between the master PD/PSE 12 and the right side adjacent slave PD/PSE #1. In FIG. 6, the PSE input port of the PSE/PD hybrid interface 38 is coupled to its associated wire pair 20. The closing of the switch 40 or 44 connects the voltage source 14 to the left side or right side wire pair 20, or both.

Figure 3A:
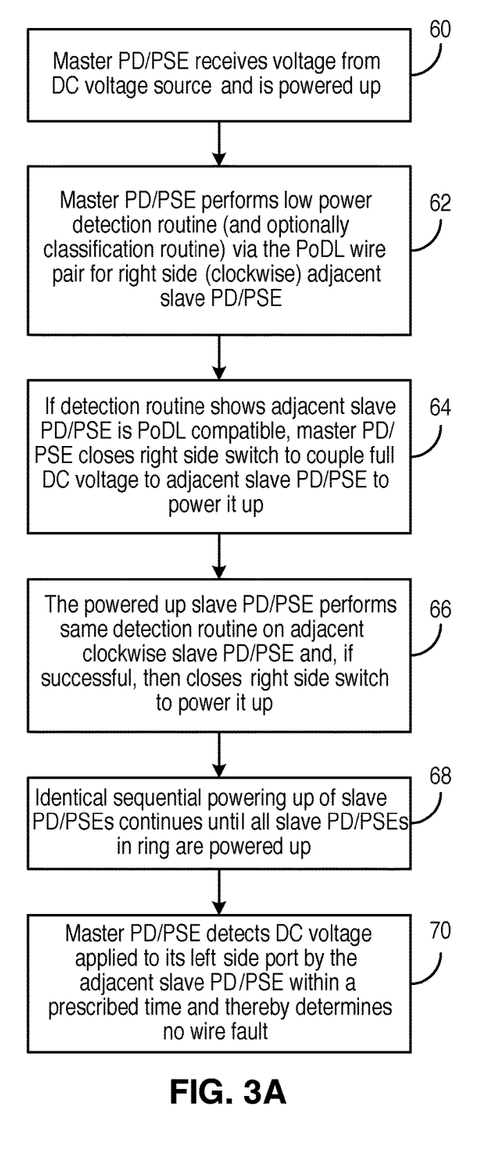
FIGS. 3A and 3B are flowcharts describing the operations of the systems of FIGS. 1 and 2, respectively, during normal operation and when there is a wire fault.

The flowchart of FIG. 3A describes the method when there is no wire fault. In step 60 of FIG. 3A, the master PD/PSE 12 receives a voltage from the DC voltage source 14 and powers up.

In step 62, the master PD/PSE 12 performs a low power detection routine (and optionally a classification routine) via the wire pair 20 for the right side adjacent slave PD/PSE #1, assuming a clockwise sequential powering up of the slave PD/PSEs. Alternatively, the master PD/PSE 12 could initiate a counter-clockwise slave PD/PSE powering up routine. During the detection phase, the master PD/PSE 12 applies a first current limited voltage for a fixed interval to the slave PD/PSE #1, via the twisted wire pair 20, and then applies a second current limited voltage for a fixed interval, while looking for a characteristic impedance of the slave PD/PSE #1 (about 25 k Ohms) by detecting the resulting current.

In step 64, if the correct signature impedance is detected, the master PD/PSE 12 assumes that the slave PD/PSE #1 is PoDL-compatible and closes its right side switch 44 (FIG. 6) so that the slave PD/PSE #1 receives the full DC voltage via its DC coupling inductors 36 (FIG. 4). The slave PD/PSE controller 26 detects that the voltage is above a certain threshold and then closes its left side switch 40 to couple the full DC voltage to its DC/DC converter 50 (FIG. 5) to fully power up the slave PD/PSE #1. The slave PD/PSE #1 may now receive and transmit Ethernet data via its PHY 30.

In step 66, the newly powered up slave PD/PSE #1 automatically performs the same detection routine on its downstream slave PD/PSE #2. If the signature impedance is detected, the slave PD/PSE #1 closes its right side switch 44 to couple the DC voltage to the slave PD/PSE #2. The slave PD/PSE #2, after detecting that the DC voltage is above a threshold, then closes its left side switch 40 to fully power up.

In step 68, the identical process is performed by all the slave PD/PSEs #3 through #n in sequence so that all the slave PD/PSEs are powered up. The powering up time may be as little as 1-2 seconds, depending on the number of slave PD/PSEs in the ring.

In step 70, the master PD/PSE controller 58 (FIG. 6) detects that the slave PD/PSE #n has provided the DC voltage at the left port 16 of the master PD/PSE 12 within a prescribed period of time, such as 1-4 seconds, and thereby determines that all the slave PD/PSEs are powered up and there is no wire fault. The same technique may have been performed by sequentially powering up the slave PD/PSEs in a counter-clockwise manner.

Figure 3B:
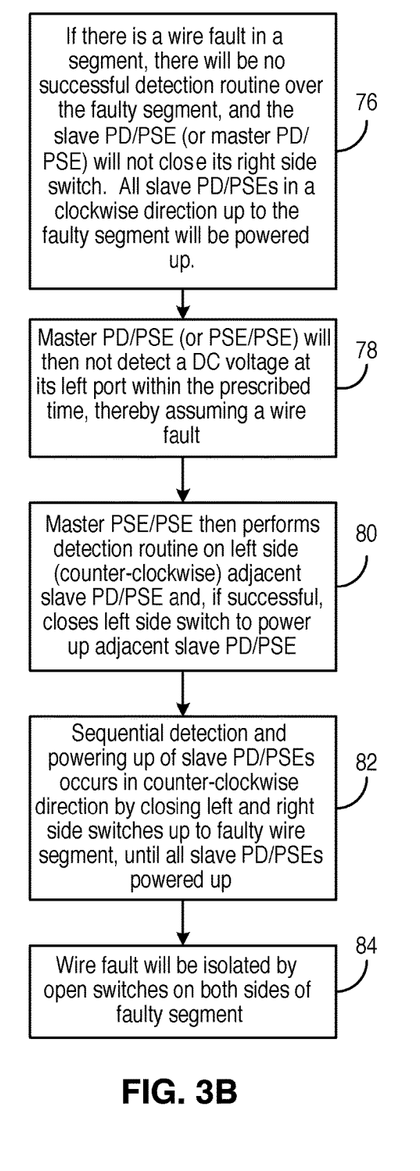

FIGS. 2 and 3B illustrate the situation where there is a wire fault, such as a short or an open wire, in the segment between the slave PD/PSEs #4 and #n-1. In FIG. 2, the identity of the master is shown as master PSE/PSE 12 since its function is to provide DC power to both ports 16 and 18. Similarly, when describing the slave devices on the left side during the faule, the order of "PD" and "PSE" is reversed to convey that they receive power from their right ports 18 and provide power to their left ports 16.

In step 76 of FIG. 3B, the powering up sequence proceeds clockwise, as previously described, until the slave PD/PSE #4 is not able to detect the signature impedance in the slave PD/PSE #n-1 due to the wire fault. Accordingly, the slave PD/PSE #4 will not close its right side switch 44.

In step 78, the master PSE/PSE 12 detects that the DC voltage has not been applied to its left port 16 within the prescribed time, indicating a fault somewhere in the ring.

In response to the master PSE/PSE 12 not detecting the DC voltage from its left side, the master PSE/PSE 12 initiates a second routine, whereby the same detection/switching sequence described above is initiated staring on the left side of the master PSE/PSE 12. The slave PSE/PDs, starting with the slave PSE/PD #n are then powered up counter-clockwise in sequence, by closing of the various switches 40 and 44, until the wire fault is encountered. At this point, all the slave PD/PSEs (and PSE/PDs) are powered up due to the clockwise and counter-clockwise application of the DC voltage from the master PSE/PSE 12.

In step 84, the wire fault is isolated by the open switches 40 or 44 on its left and right sides. The slave PD/PSE #4 or slave PSE/PD #n-1 may identify the location of the fault via the wire pair 20 to the master PSE/PSE 12 via Ethernet data signals, and an alarm may be triggered to identify the problem.

The above process is particularly valuable for systems where power redundancy is important for high reliability. Although the word "ring" is used to describe the closed string of slave PD/PSEs, the shape of the ring is immaterial and may be serpentine, rectangular, circular, or any other shape.

FIGS. 7-9B illustrate another configuration of the same master PD/PSE 12 and slave PD/PSEs, where, instead of a ring, the slave PD/PSEs are connected serially between two identical master PD/PSEs 90 and 92. Both master PD/PSEs 90 and 92 receive DC power from a respective voltage source 14 and 93 at their power terminals (not via their ports 16 and 18). The functions of the master PD/PSEs 90 and 92, and the slave PD/PSEs change depending on whether or not there is a wire fault, so the labels PD and PSE are changed in FIGS. 7 and 8 to reflect the different functions of each side of the same circuitry.

Figure 7:
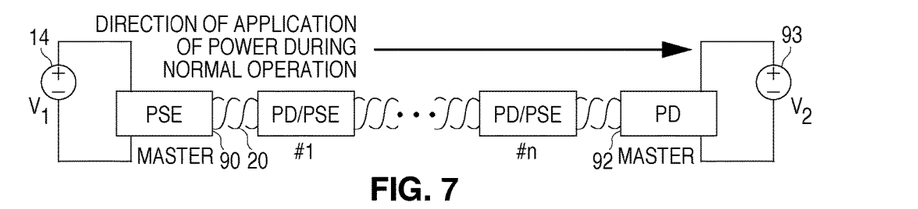
FIG. 7 illustrates another embodiment of the invention where the slave PD/PSEs are connected between two master PSEs.

FIG. 7 assumes there is no wire fault, and the flowchart of Fig, 9A applies. The flowcharts are abbreviated since the steps are very similar to the steps described in FIGS. 3A and 3B.

Figure 9A:
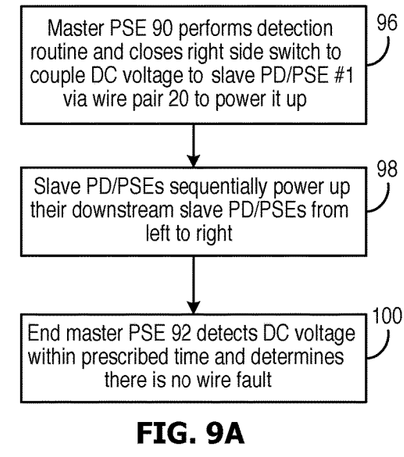
FIGS. 9A and 9B are flowcharts describing the operations of the systems of FIGS. 7 and 8, respectively, during normal operation and when there is a wire fault.

In step 96 of FIG. 9A, the master PSE 90 performs its detection routine and closes its right switch 44, if the downstream slave PD/PSE #1 is detected as being PoDL-compatible, to power up the slave PD/PSE #1.

In step 98, each successive slave PD/PSE performs the same detection routine and closes its right switch 44 to sequentially power up all the slave PD/PSEs.

In step 100, the end master PD 92 detects the application of the DC voltage to its left port 16 within the prescribed time and determines there is no wire fault.

Figure 8:
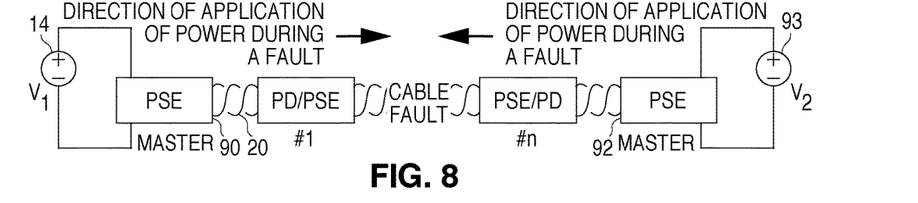
FIG. 8 illustrates the system of FIG. 7 but where there is a wire fault between two slave PD/PSEs.
Figure 9B:
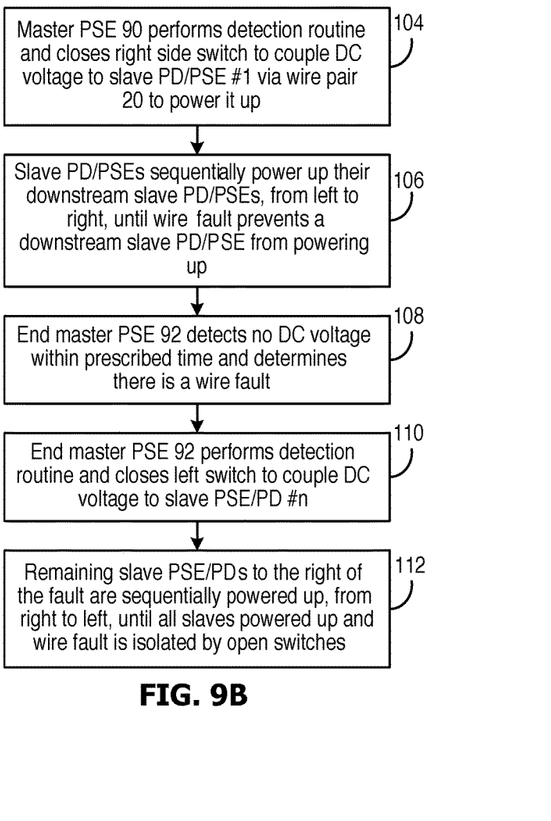

FIGS. 8 and 9B assume there is a wire fault between the slave PD/PSE #1 and the slave PSE/PD #2. In step 104 of FIG. 9B, the master PSE 90 performs its detection routine and closes its right switch 44, if the downstream slave PD/PSE #1 is detected as being PoDL-compatible, to power up the slave PD/PSE #1.

In step 106, each successive slave PD/PSE performs the same detection routine and closes its right switch 44 to sequentially power up all slave PD/PSEs to the left side of the wire fault.

In step 108, the end master PSE 92 detects no DC voltage at its left port 16 within the prescribed time and determines there is a wire fault.

In response, in step 110, the end master PSE 92 performs a detection routine for the slave PSE/PD #n and closes its left switch 40 to apply the DC voltage to the slave PSE/PD #n.

In step 112, the remaining slave PSE/PDs are sequentially powered up, from right to left, in the same way until all the slave PD/PSEs are powered up and the wire fault is isolated by open switches 40 and 44 on either side of it.

Since the master PSE/PDs 90 and 92 (the label depends on its function) only use one port, the other port shown in FIG. 6 may be optionally eliminated to reduce the size of the device. The software or firmware in the master PSE/PDs in FIG. 7 is different from the software or firmware in the master PSE/PD of FIG. 1 due to the different configurations and methods, but the hardware circuitry may be the same as shown in FIG. 6.

The same techniques may be applied to a PoE system where the DC power is applied over two or more wire pairs and the differential data is powered over two wire pairs. The wires may be any type of conductor, including a twisted pair, a coax cable, or even include a metal body of an automobile.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A powered data communications system comprising:
   a master device having a first port and a second port, the master device being configured to apply a DC voltage from a voltage source to the first port;
   a plurality of slave devices, each slave device having a third port and a fourth port;
   conductors serially connecting the slave devices, via their third port and fourth port, to the master device in a ring between the first port and the second port of the master device, wherein a first end slave device is coupled to the first port of the master device, and a second end slave device is coupled to the second port of the master device, the conductors being configured to simultaneously carry the DC voltage and data;
   the plurality of slave devices being configured to be sequentially powered up, starting with the first end slave device and ending with the second end slave device, by sequentially applying the DC voltage to an adjacent downstream slave device in a first direction around the ring by closing switches in the slave devices;

the slave devices and the master device being configured to perform a detection routine on the adjacent downstream slave device prior to applying the DC voltage to the adjacent downstream slave device; and wherein the master device is configured to detect whether the DC voltage has been sequentially applied to all the slave devices by detecting a presence of the DC voltage at the second port of the master device and, if the master does not detect the presence of the DC voltage at the second port, the master device is configured to apply the DC voltage to both the first port and the second port to sequentially power up the slave devices in both the first direction and a second direction around the ring of the slave devices.

2. The system of claim 1 wherein the slave devices are configured to perform the detection routine by detecting a presence of a signature impedance in the adjacent downstream slave device and then applying the DC voltage to the adjacent downstream device.

3. The system of claim 1 wherein the master device comprises a first switch coupled to the first port for connecting the DC voltage to the conductors coupled to the first port, and comprises a second switch coupled to the second port for connecting the DC voltage to the conductors coupled to the second port.

4. The system of claim 3 wherein the master device comprises a master controller configured to control opening and closing of the first switch and the second switch to apply the DC voltage to the first port and second port, respectively.

5. The system of claim 3 wherein the slave devices comprise a third switch coupled to the third port for coupling the DC voltage to the associated slave device to power up the associated slave device, wherein the slave devices further comprise a fourth switch coupled to the fourth port for coupling the DC voltage to the conductors for powering up a downstream slave device.

6. The system of claim 5 wherein the slave devices comprise a slave controller configured to control opening and closing of the third switch and fourth switch to conduct the DC voltage to and from the associated slave device.

7. The system of claim 1 wherein the DC voltage is coupled to the conductors via inductors.

8. The system of claim 1 wherein each of the slave devices comprises a physical layer device (PHY) for receiving differential data on the conductors via AC coupling components.

9. The system of claim 1 wherein the conductors comprise a twisted wire pair that carry both the DC voltage and differential data.

10. The system of claim 1 wherein the system is a Power over Data Lines (PoDL) system.

11. The system of claim 1 wherein the system is a Power over Ethernet (PoE) system.

12. A method performed by a powered data communications system comprising:
providing a DC voltage, by a master device, to a first port of the master device, the master device also having a second port;
wherein a plurality of slave devices, each slave device having a third port and a fourth port, are connected serially between the first port and the second port in a ring via conductors configured to simultaneously carry the DC voltage and data, wherein a first end slave device is coupled to the first port of the master device, and a second end slave device is coupled to the second port of the master device;
sequentially powering up the plurality of slave devices, starting with the first end slave device and ending with the second end slave device, by sequentially applying the DC voltage to the adjacent downstream slave device in a first direction around the ring by closing switches in the slave devices;
performing a detection routine on the adjacent downstream slave device prior to applying the DC voltage to the adjacent downstream slave device in the first direction around the ring;
detecting, by the master device, whether the DC voltage has been sequentially applied to all the slave devices by detecting a presence of the DC voltage at the second port of the master device; and
if the master does not detect the presence of the DC voltage at the second port, applying, by the master device, the DC voltage to both the first port and the second port to sequentially power up the slave devices in both the first direction and a second direction around the ring of the slave devices.

13. A powered data communications system comprising:
a first master device having a first port, the first master device being configured to provide a DC voltage and apply the DC voltage to the first port;
a second master device having a second port, the second master device being configured to provide the DC voltage and apply the DC voltage to the second port;
a plurality of slave devices connected serially between the first master device and the second master device, each slave device having a third port and a fourth port;
conductors serially connecting the slave devices, via their third port and fourth port, between the first port of the first master device and the second port of the second master device, wherein a first end slave device is coupled to the first port of the first master device, and a second end slave device is coupled to the second port of the second master device, the conductors being configured to simultaneously carry the DC voltage and data;
the plurality of slave devices being configured to be sequentially powered up, starting with the first end slave device and ending with the second end slave device, by sequentially applying the DC voltage to an adjacent downstream slave device in a first direction by closing switches in the slave devices; and
wherein the second master device is configured to detect whether the DC voltage has been sequentially applied to all the slave devices by detecting a presence of the DC voltage at the second port of the second master device and, if the second master does not detect the presence of the DC voltage at the second port, the second master device is configured to apply the DC voltage to the second port to sequentially power up the slave devices in a second direction.

14. The system of claim 13 wherein the slave devices and the first master device are configured to perform a detection routine on an adjacent downstream slave device prior to applying the DC voltage to the adjacent downstream slave device.

15. The system of claim 13 wherein the first master device comprises a first switch coupled to the first port for connecting the DC voltage to the conductors coupled to the first port, and the second master device comprises a second switch coupled to the second port for connecting the DC voltage to the conductors coupled to the second port.

16. The system of claim 15 wherein the first master device comprises a first master controller configured to control opening and closing of the first switch to apply the DC voltage to the first port, and wherein the second master device comprises a second master controller configured to control opening and closing of the second switch to apply the DC voltage to the second port.

17. The system of claim 16 wherein the slave devices comprise a third switch coupled to the third port for coupling the DC voltage to the associated slave device to power up the associated slave device, wherein the slave devices further comprise a fourth switch coupled to the fourth port for coupling the DC voltage to the conductors for powering up a downstream slave device.

18. The system of claim 17 wherein the slave devices comprise a slave controller configured to control opening and closing of the third switch and fourth switch to conduct the DC voltage to and from the associated slave device.

19. A master device for use in a powered data communications system, the powered data communication system including a plurality of slave devices connected in a ring with master device, the master device having a first port and a second port, the plurality of slave devices, each having a third port and a fourth port, for being connected serially between the first port and the second port in the ring via conductors configured to simultaneously carry a DC voltage and data, wherein a first end slave device is for being coupled to the first port of the master device, and a second end slave device is for being coupled to the second port of the master device, the master device comprising:

a DC voltage source for supplying a DC voltage to the first port of the master device;
  the master device comprising a first switch for supplying the DC voltage to the first end slave device, wherein the slave devices sequentially apply the DC voltage to an adjacent downstream slave device in a first direction around the ring;
  the master device comprising a detector for detecting whether the DC voltage has been sequentially applied to all the slave devices by detecting a presence of the DC voltage at the second port of the master device; and
  a second switch in the master device controlled so that, if the master does not detect the presence of the DC voltage at the second port, the master device applies the DC voltage to both the first port and the second port to sequentially power up the slave devices in both the first direction and a second direction around the ring of the slave device;
  the master device comprising low power detection circuitry in the master device for determining if the first end slave device of the second end slave device is compatible for receiving the DC voltage.

20. The master device of claim 19 wherein the master device is configured to apply the DC voltage to the second port if the detector does not detect the presence of the DC voltage at the second port within a prescribed time.

* * * * *